May 20, 1952   J. L. PILON ET AL   2,597,669
DRILL BIT

Filed Jan. 20, 1950

Inventors
Joseph L. Pilon
A. Beaulieu
by Douglas S. Johnson
atty

Patented May 20, 1952

2,597,669

UNITED STATES PATENT OFFICE 2,597,669

DRILL BIT

Joseph L. Pilon and Anede Beaulieu, North Bay, Ontario, Canada, assignors to Inspiration Mining & Development Company Limited, Toronto, Ontario, Canada Application January 20, 1950, Serial No. 139,584

4 Claims. (Cl. 255—72)

This invention relates to improvements in drill bits of the type employing replaceable rolling cutters and more particularly to a diamond drill bit employing diamond-encrusted rollers.

Drill bits have heretofore been proposed in which a plurality of cutters have been mounted in the annular working face of the bit to rotate on radial axes as the bit is rotated. This type of bit affords the presentation of a plurality of cutting elements under drilling which are moved into and out of cutting contact but each element is constantly worn at the same angle so that no new cutting edges on the element are presented. Additionally, the rolling cutters seriously minimize the cutting action as the cutting elements merely roll on the surface being cut.

The principal object of this invention is to provide an improved drill bit in which new cutting edges on the cutting elements are continually presented as the drill advances but in which the cutting elements are held rigidly and fixedly against displacement under bit rotation to bite into the surface under the full torque thrust of the drill to afford a sharper bit and an improved cutting action for faster cutting.

A further important object is to provide an improved cutting roller which can be easily and quickly secured in the working face of the bit, will provide long life operation, and can be readily replaced on becoming worn.

The principal feature of the invention consists in mounting a plurality of cutting rollers in the annular face of a drill bit to rotate on axes perpendicular to the radii cutting said rollers.

A further important feature consists in forming the cutters as diamond-encrusted rollers with diamond chips forming the cutting elements.

A still further feature consists in forming the rollers to present their cutting elements below and outwardly peripherally of the annular working face of the bit.

Another feature resides in mounting the rollers for convenient replacement.

These and other objects and features will become apparent with reference to the following description and drawings in which Figure 1 is an elevational view of a diamond drill bit employing diamond-encrusted rollers in accordance with my invention with portions broken away for clarity.

Referring to the accompanying drawings, we show the bit 1 of annular form presenting an annular working face 2. Formed in the annular working face are a plurality of radial slots 3 which have on each side thereof, intermediate the width of the working face, auxiliary transverse slots 4 of somewhat lesser depth and opening into the slots 3.

Figure 1:
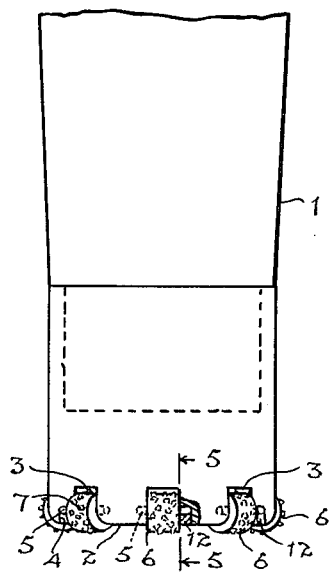
Figure 2:
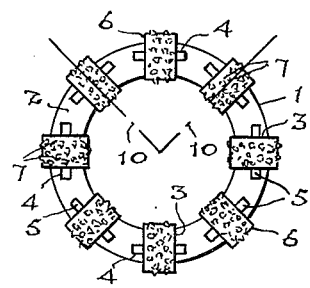
Figure 2 is an underside plane view of the bit of Figure 1.
Figure 3:
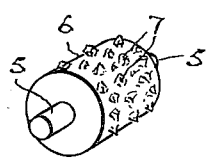
Figure 3 is a perspective view of one of the cutting elements of Figures 1 and 2 showing the element as a diamond-encrusted roller.

The transverse slots 4 on opposite sides of each radial slot 3 are in alignment to afford a mounting for the axles 5 of the cutters 6, shown particularly in Figures 2 and 3. These cutters 6 are in the form of diamond-encrusted rollers wherein the cutting elements are small diamonds or diamond chips 7 embedded in the roller surface and presenting a plurality of cutting edges 8, shown particularly in Figures 4 and 5.

The diamond-encrusted roller cutters 6 are mounted in the radial slots 3 with their axles supported in the transverse slots 4, the bottom surfaces 9 of which are grooved to the contour of the axle to permit the ready turning of the rollers.

It will be seen on reference to Figure 2 that with the axles 5 in the transverse slots 4 the rollers are arranged to rotate on axes which extend circumferentially so that the rollers rotate in radial planes and radii 10 through the centre of the rollers form the right bisectors of the axles.

Under drilling, as the pressure will always be upwardly on the rollers forcing the axles against the bottom bearing surfaces 9 of the transverse slots, no elaborate fittings or bearing surfaces need be provided opposite the bearing surface 9 in the slots 4, and it is sufficient to simply close the slots 4 with a suitable temporary flux filler 12 or other equivalent to maintain the rollers in position in their slots against gravity.

It will be appreciated that in drilling the bit is rotated and as the drilling or cutting is effected it has a composite motion of circumferential movement and axial advancement.

Under pure rotative movement, that is, circumferential movement, the force acting through the reaction of the surfaces being cut on the cutting elements 7 are substantially parallel the axles 5 and there will be no torque imparted to rotate the rollers 6 by such parallel reactive thrusts under the circumferential bit movement.

Under axial bit movement however the reactive thrusts of the surfaces engaged by the cutting element 7 will impart a torque about the axles 5 to rotate the rollers 6.

As shown in Figure 2, the rollers 6 are of a diameter to project the cutting elements 7 beyond both the outer and inner walls of the bit I as well as beyond the annular working face 2. Each cutting element 7 is provided with cutting edges 8 which therefore perform a cutting action while being moved under axial bit movement through 180° from a position with the cutting element within the inner wall of the working face 2 and intersected by a substantially horizontal radius to a position without the outer bit wall and intersected by a substantially horizontal radius.

Figure 5:
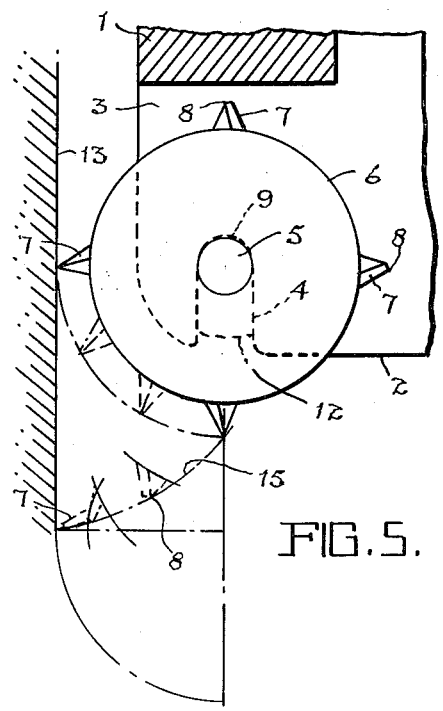
Figure 5 is an enlarged fragmentary vertical sectional view taken on the line 5—5 of Figure 1 with only selected cutting edges depicted and illustrating the relative movement of the cutting roller and drill bit under axial bit movement and the profile cut by an individual diamond.

Thus it will be seen, particularly with reference to Figure 5, that each cutting element 7 is presented to the surface 13 being cut at continually changing angles as the bit is axially advanced.

It is to be again noted that at each new angle that a cutting element is presented the cutting element is rigidly and fixedly held against the reactive thrust by the surface being cut while the bit is moving with pure rotative or circumferential movement so that the cutting edges 8 of each cutting element will be worn in accordance with the particular angular relation of the cutting element and the surface being cut. This is an extremely important feature, providing wear on the cutting elements along continually changing planes to continually provide new cutting edges 8 to maintain the cutting elements or diamonds sharp at all times and to provide more uniform wear so that the diamonds will serve as useful cutting elements throughout their entire life.

Figure 4:
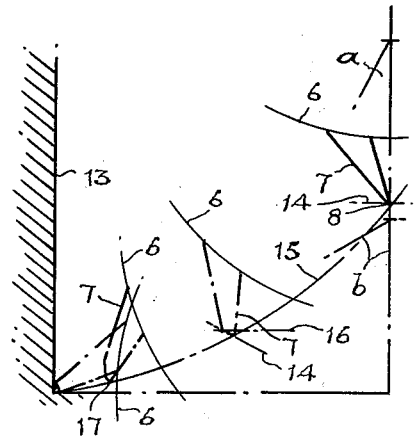
Figure 4 is a very much enlarged diagrammatic illustration showing the changing angles at which the diamonds are presented to wear on continually changing planes as the bit is axially advanced, the view showing progressive positions of a single diamond chip and the profile cut thereby.

This feature will be better understood with particular reference to Figure 4 wherein the cutting element 7 is illustrated first vertically beneath the axle 5 in solid lines to be worn along a plane 14. The cutting element is shown in dotted line at an angle $a$ to the axle 5 after the bit has been advanced axially so that the particular cutting element illustrated has cut the profile 15. In this intermediate dotted position it will be seen that the plane of wear has changed under bit rotation to afford wear on the plane 16, providing a new cutting edge 17. In the lowermost position after the bit has been advanced axially still further the cutting element is shown at an increased angle $b$ relative the vertical from the axle 5. Here again the wear plane is different affording wear on the plane 18 to provide further new cutting edges.

Figure 5 also traces the profile 15 cut by a single cutting element 7 under axial bit advancement and rotation of the roller 6 through 90° showing again the different planes of wear occurring under different positions of the cutting element.

The above action will be seen to maintain the diamonds sharp at all times continually presenting new cutting edges as the bit is advanced but maintaining the cutting edges fixedly in cutting position during circumferential bit movement.

The wear on the cutter or diamond 7 will be uniform and when any of the cutters 6 need to be replaced it will be a simple matter to remove the temporary closures 12 of the transverse slots 4, take out the whole cutter element and insert a replacement cutter.

It will be appreciated that, the maintaining of the diamond cutting elements 7 fixed during the actual circumferential drilling movement of the bit and arranging new cutting edges to be continually presented upon axial bit movement, a very desirable cutting action will be provided, and it has been found that a bit constructed in accordance with my invention provides materially faster cutting than either conventional bits having the cutting elements embedded in their working faces or having cutters mounted to rotate on radial axes.

It will be understood that various modifications may be made in the manner of actually mounting the cutting elements without departing from the scope of our invention.

What we claim as our invention is:

1. In a diamond drill bit, an annular working face, a plurality of rollers in the form of diamond-encrusted cylinders of uniform diameter and of a length to occupy an appreciable proportion of said annular working face, said cylinders being mounted in said annular working face with their length extending substantially in a circumferential direction to rotate upon axial movement of the bit on circumferentially extending axes perpendicular to radii of said bit.

2. In a diamond drill bit, an annular working face, a plurality of rollers in the form of diamond-encrusted cylinders of substantially uniform diameter and of a substantial length to occupy an appreciable proportion of said annular face and presenting multiple diamond cutting points along their length, said cylinders being mounted on concentric axles removably set in said annular face and extending substantially circumferentially of the bit perpendicular to radii of said bit and having as right bisectors radii of said bit, said axles permitting rotation of said rollers upon axial movement of said bit to present new cutting points and maintaining said rollers against rotation upon circumferential bit movement to maintain cutting points in fixed cutting relation under such circumferential bit movement.

3. In a diamond drill bit, an annular working bit face, a plurality of cutter rollers mounted on axles set in said annular bit face and extending circumferentially to support said rollers for rotation on axial bit movement but preventing roller rotation on circumferential bit movement, each of said rollers being a cylinder substantially uniform in diameter for a substantial length to occupy an appreciable proportion of said annular bit face and having mounted on the periphery thereof a plurality of diamond cutting elements formed with multiple cutting edges presented beyond the cylindrical periphery in different directions, said cutting edges being presented as rigidly fixed under circumferential bit movement and being presented at continually changing angles under axial bit movement to wear on continually changing planes whereby said diamond cutting elements are continually sharpened through wear on said changing planes as said bit is advanced through a surface being cut.

4. In a diamond drill bit, an annular working face, a plurality of radial slots formed in said working face, aligned transverse slots formed in said annular working face and extending circumferentially from the sides of said radial slots, rollers in the form of uniform diameter cylinders of appreciable length substantially equal to the width of said slots and encrusted with diamonds and presenting multiple diamond cutting edges, said cylinders being mounted in said radial slots on concentric axles removably received in said aligned transverse slots to rotate in radial planes, the cutting edges of said rollers being presented beyond said annular working face and beyond the inner and outer walls defining the inner and outer peripheries of said annular working face, said rollers being normally non-rotatable under circumferential bit movement but rotating under axial bit movement to advance cutting edges to cut at continually changing angles whereby said edges are worn in continually changing planes to maintain said edges sharpened.

JOSEPH L. PILON.
ANEDE BEAULIEU.

REFERENCES CITED

The following references are of record in the file of this patent:

UNITED STATES PATENTS

| Number | Name | Date |
| --- | --- | --- |
| 821,130 | Smith et al. | May 22, 1906 |
| 1,302,967 | Pickin | May 6, 1919 |
| 2,121,202 | Kilgore | June 21, 1938 |
| 2,182,562 | Koebel | Dec. 5, 1939 |
| 2,511,831 | Adamson | June 20, 1950 |